United States Patent Office 3,597,359
Patented Aug. 3, 1971

3,597,359
FUNCTIONAL FLUID COMPOSITIONS
Terrill D. Smith, Kirkwood, Mo., assignor to
Monsanto Company, St. Louis, Mo.
No Drawing. Filed Mar. 22, 1968, Ser. No. 715,175
Int. Cl. C23f 11/12; C09k 3/00; C10m 3/40
U.S. Cl. 252—78
17 Claims

ABSTRACT OF THE DISCLOSURE

Compositions of the class which exhibit the ability to inhibit and control damage to mechanical members in contact with said compositions by the incorporation of a perfluorinated alkylene ether-containing compound having a degree of polymerization of from 1 to 50 into a class of base stocks representative of which are esters and amides of phosphorus, o-silicates and polysilicones. The compositions have many uses, among which are their use as hydraulic fluids.

---

This invention relates to functional fluid compositions having an ability to inhibit and control damage to mechanical members in contact with said fluid compositions, to functional fluid compositions which exhibit an improved tendency to resist fluid degradation and more particularly to functional fluid compositions having incorporated therein an additive amount, sufficient to inhibit and control damage, of a perfluoro alkylene ether-containing compound.

Many different types of materials are utilized as functional fluids and functional fluids are used in many different types of applications. Thus, such fluids have been used as electronic coolants, diffusion pump fluids, lubricants, damping fluids, bases for greases, power transmission and hydraulic fluids, heat transfer fluids, heat pump fluids, refrigeration equipment fluids and as filter mediums for air conditioning systems. In many of these uses there have been reports of damage to the fluid during use and to mechanical members, especially metallic members, in contact with the fluid as evidenced by a loss of weight of such members. Thus, damage has been reported in aircraft hydraulic systems, jet turbine control systems, and steam turbine control systems. Damage has also been observed on such materials as glass, Teflon, Mylar, Plexiglas and other members constructed from materials other than metals.

One particularly undesirable condition which exists during the use of a functional fluid and which can cause damage is cavitation, which can be described as a phenomenon which results in the formation and subsequent violent collapse of vapor-filled bubbles in a fluid subjected to requisite pressure changes. Bubbles can be formed when the fluid pressure is at or below its bubble point pressure and when fluid temperature peaks above fluid bubble point temperature; above the bubble point pressure, the bubbles collapse. Pressure changes sufficient to cause cavitation can occur in several ways; for example, a fluid flowing through a restriction, such as a partially closed valve, can encounter at the point of highest velocity a pressure far lower than both the bubble point and the valve outlet pressures thus resulting in bubble formation. As these bubbles reach a point of high pressure, for example on the discharge side of the valve, a violent collapse of the bubbles occurs thereby producing shock waves which can be severe enough to damage the fluid and mechanical members in contact with the fluid. As another example, cavitation conditions can occur when a surface is moved through or vibrated in a relatively stagnant liquid.

While there are many undesirable results caused by damage, one important aspect of the problem of damage is the effect on hydraulic systems and fluids experiencing such damage. For example, the structural mechanical parts in a hydraulic system, such as pumps and valves, exhibit a marked decrease in strength, and the geometry of the parts is altered. Such changes in the case of pumps can cause a decrease in pumping efficiency and in the case of valves can cause faulty operations, excessive leakage or even hazardous conditions. As a result, damage necessitates premature overhaul of mechanical parts which is both costly and time consuming. In addition, as damage occurs the metal from metallic mechanical parts in contact with the functional fluid contaminates the fluids requiring premature draining of the fluids from the system, filter clogging and excessive filter replacement, and can cause a change in physical and chemical properties of the fluids. Also, metal contaminants can reduce the oxidative stability of a fluid thereby adversely affecting fluid performance. In addition to any effects resulting from contamination by metal (or other) contaminant, such damage to the fluid can manifest itself in numerous ways, among which are (a) viscosity change, (b) increase in acid number, (c) formation of insoluble materials, (d) increased chemical reactivity and (e) discoloration.

It is, therefore, an object of this invention to provide functional fluid compositions having an ability to inhibit and control damage.

Further objects will be apparent from the following description of the invention.

It has now been found that damage, herein defined to include damage to a functional fluid and to mechanical members in contact with said fluid, can be effectively controlled and inhibited in the many functional fluid systems described by the incorporation into a functional fluid of a damage inhibiting amount of a perfluoro alkylene ether-containing compound represented by the formula

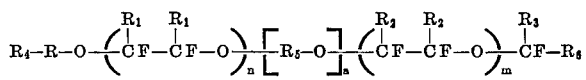

wherein R is selected from the group consisting of alkylene, alkoxyalkylene and perfluoroalkylene, each $R_1$ and $R_2$ are each selected from the group consisting of fluoro and trifluoromethyl provided that not more than one $R_1$ is trifluoromethyl and provided that not more than one $R_2$ is trifluoromethyl, $R_3$ is selected from the group consisting of fluoro and trifluoromethyl, $R_4$ is selected from the group consisting of hydrogen and halogen provided that when R is alkylene or alkoxyalkylene $R_4$ is hydrogen, $R_5$ is perfluoroalkylene having at least 2 carbon atoms and $R_6$ is selected from the group consisting of hydrogen, trifluoromethyl, perfluoroethyl,

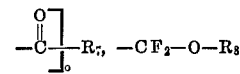

and

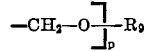

wherein $R_7$ is selected from the group consisting of hydroxyl, the residuum of an ester-forming compound and the residuum of an amide-forming compound, $R_8$ is selected from the group consisting of alkyl and alkoxyalkyl and $R_9$ is selected from the group consisting of hydrogen and a residuum of an alcohol-reacting compound, $o$ and $p$ are each whole numbers having a value of at least 1 provided that when $R_7$ is hydroxyl $o$ is 1 and provided that when $R_9$ is hydrogen $p$ is 1, $a$ is a whole number having a value of 0 to 1 and $n$ and $m$ are each whole numbers having a value of from 0 to 50, provided that the perfluoro alkylene ether-containing compound contains at least one perfluoro alkylene ether unit containing from 2 to 3 carbon atoms and further provided that the perfluoro alkylene ether unit is present in the perfluoro alkylene ether-containing compound at a concentration of at least about 50% by weight and mixtures thereof.

It is an important part of this invention that the incorporation of a perfluoro alkylene ether-containing compound in functional fluids produces a functional fluid composition having the ability to inhibit damage without completely affecting adversely other essential properties of such fluids such as viscosity, oxidative and thermal stability, corrosion resistance in the presence of metal parts and lubricating qualities of the functional fluid.

The concentration of a perfluoro alkylene ether-containing compound in a functional fluid is adjusted in terms of the particular system and the functional fluid which is utilized in this system to provide functional fluid compositions of this invention which contain an additive amount of a perfluoro alkylene ether-containing compound sufficient to inhibit and control damage. In addition the particular perfluoro alkylene ether-containing compound can be adjusted with respect to the number of perfluoro alkylene ether-containing units as well as the weight percent of the perfluoro alkylene ether unit in the compound in order to obtain the maximum amount of inhibition of damage based on the use of a minimum concentration of the perfluoro alkylene ether-containing compound. In addition, $R_7$ and $R_9$ which are the residuum of an ester- and amide-forming compound and the residuum of an alcohol-reacting compound, respectively, can be varied with respect to the number of carbon atoms present in the residuum and with respect to the type of atoms present in such residuum in order to modify one or more physical properties of the perfluoro alkylene ether-containing compound. An example of altering physical properties would be adjusting $R_7$ and $R_9$ to alter the viscosity characteristics or the solubility characteristics of a perfluoro alkylene ether-containing compound in a functional fluid. For the functional fluid compositions of this invention, the concentration of a perfluoro alkylene ether-containing compound in the composition can vary from about 0.005 weight percent to about 15 weight percent. The preferred concentration range of a perfluoro alkylene ether-containing compound in the functional fluid compositions of this invention is from about 0.01 weight percent to about 10 weight percent and even more preferably from about 0.025 weight percent to about 5 weight percent. Therefore, included within the present invention are compositions comprising a functional fluid and a damage inhibiting amount of a perfluoro alkylene ether-containing compound, that is, a perfluoro alkylene ether-containing compound is added, in a concentration sufficient to control and inhibit damage. The compositions of this invention are prepared by incorporating a damage inhibiting amount of a perfluoro alkylene ether-containing compound into the functional fluid. Thus, the process for preparing a functional fluid having the ability to inhibit and control damage to mechanical members in contact with the functional fluid is accomplished by adding a perfluoro alkylene ether-containing compound to a functional fluid to obtain a concentration of a perfluoroalkylene ether-containing compound in the functional fluid of from about 0.005 weight percent to about 15 weight percent with sufficient agitation to incorporate the additive.

The functional fluids, to which a perfluoro alkylene ether-containing compound is added to provide the functional fluid compositions of this invention, include functional fluids comprising a major amount of a fluid base stock, representative base stocks of which are hydrocarbon phosphorus esters, hydrocarbon phosphorus amides, hydrocarbon silicates, alkyl thiophenes and mixtures of the aforedescribed base stocks, blends of hydrocarbon phosphorus esters and/or hydrocarbon phosphorus amides with halogenated blending agents, representative of which are halodiphenyl ethers, halobenzenes, halogenated polyphenyls, halonaphthalenes, haloalkylated benzenes, perhalodienes and perhalocyclicdienes and mixtures thereof.

Whereas the above base stocks can be utilized to prepare functional fluid compositions of this invention when utilized in major amounts, it is preferred to use such fluid base stocks in the functional fluid compositions at a concentration of at least about 60 weight percent and even more preferably at concentrations of 65, 75, 85 and 95 weight percent.

The perfluoro alkylene ether-containing compounds which are preferred can be defined by (1) the number of perfluoro alkylene ether units in the perfluoro alkylene ether-containing compound, (2) the weight percent of these units in the perfluoro alkylene ether-containing compound and (3) the relative proportion of the number of perfluoro alkylene ether units containing 3 carbon atoms to the number of perfluoro alkylene ether units containing 2 carbon atoms in the perfluoro alkylene ether-containing compound.

With respect to the preferred number of repeating perfluoro alkylene ether units, such number can be defined by the sum of $n+m$ in the above formula for the perfluoro alkylene ether-containing compound and in general it is preferred that the sum of $n+m$ be from 1 to about 25 and more preferably from 1 to about 10. With respect to the preferred weight percent of the perfluoro alkylene ether units in the prefluoro alkylene ether-containing compound, it is preferred that such weight percent be at least 60% more preferably at least 75% and still more preferably at least 90%. With respect to the relative proportion of the perfluoro alkylene ether units containing 3 carbon atoms to those containing 2 carbon atoms, it is preferred that such relative proportion be at least 1:1, more preferably 1.5:1 and still more preferably 2:1.

The perfluoro alkylene ether-containing compounds which are particular preferred and which are within the preferred limits as set forth above are perfluoro alkylene ether-containing compounds wherein R is selected from perfluoro alkylene having from 1 to 5 carbon atoms, alkylene having from 1 to 8 carbon atoms and alkoxyalkylene having from 1 to 12 carbon atoms, $R_5$ is perfluoro alkylene having from 2 to 10 carbon atoms and $R_6$ is selected from hydrogen,

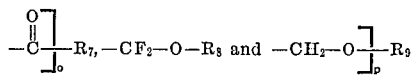

wherein $R_7$ is the residue of an ester- or amide-forming compound having from 1 to 18 carbon atoms, preferably from 1 to 8 carbon atoms and more preferably from 1 to 4 carbon atoms per each

radical attached to $R_7$, $R_8$ is selected from alkyl and alkoxyalkyl having from 1 to 12 carbon atoms, more preferably from 1 to 8 carbon atoms and $R_9$ is a residue of an alcohol-reacting compound having from 1 to 20 carbon atoms, more preferably from 1 to 14 carbon atoms and still more preferably from 1 to 8 carbon atoms per each —$CH_2$—O— radical attached to $R_9$ and $o$ and $p$ each have a value of from 1 to 4. The limits as set forth above both with respect to the number, weight percent and relative proportion of perfluoro alkylene ether units in the perfluoro alkylene ether-containing compounds as well as with respect to the preferred ranges of the number of carbon atoms for the various defined groups are preferred since such perfluoro alkylene ether-containing compounds within these limits in general are capable of functioning to inhibit and control damage in the functional fluid compositions of this invention at a minimum concentration.

For the purpose of defining a range of numbers or carbon atoms such as a whole number having a value of from 1 to 4 or for example a group having a number of carbon atoms of from 1 to 20, the word "to" is defined as including the highest number mentioned in the range and therefore is intended to mean the same as the use of the word "through." Thus, the range is an inclusive range.

Typical examples of alkyl radicals are as follows: methyl, ethyl, n-propyl, isopropyl, n-butyl, isobutyl, sec-butyl, tert-butyl, n-amyl, isoamyl, 2-methylbutyl, 2,2-dimethyl propyl, 1-methyl butyl, diethyl methyl, 1,2-dimethyl propyl, tert-amyl, n-hexyl, 1-methylamyl, 1-ethyl butyl, 1,2,2-trimethyl propyl, 3,3-dimethyl butyl, 1,1,2-trimethyl propyl, 2-methyl amyl, 1,1-dimethylbutyl, 1-ethyl 2-methyl propyl, 1,3-dimethyl butyl, isohexyl, 3-methylamyl, 1,2-dimethyl butyl, 1-methyl 1-ethyl propyl, 2-ethyl butyl, n-heptyl, 1,1,2,3-tetramethyl propyl, 1,2-dimethyl 1-ethyl propyl, 1,1,2-trimethyl butyl, 1-isopropyl 2-methyl propyl, 1-methyl 2-ethyl butyl, 1,1-diethyl propyl, 2-methyl hexyl, 1,1-dimethyl amyl, 1-isopropyl butyl, 1-ethyl 3-methyl butyl, 1,4-dimethyl amyl isoheptyl, 1-methyl 1-ethyl butyl, 1-ethyl 2-methyl butyl, 1-methyl hexyl, 1-propyl butyl, n-octyl, 1-methyl heptyl, 1,1-diethyl 2-methyl propyl, 1,1,3,3-tetramethyl butyl, 1,1-diethyl butyl, 1,1-dimethyl hexyl, 1-methyl 1-ethyl amyl, 1-methyl 1-propyl butyl, 2-ethyl hexyl, 6-methyl heptyl (iso-octyl), n-nonyl, 1-methyl octyl, 1-ethyl heptyl, 1,1-dimethyl heptyl, 1-ethyl 1-propyl butyl, 1,1-diethyl 3-methyl butyl, diisobutyl methyl, 3,5,5-trimethyl hexyl, 3,5-dimethyl heptyl, n-decyl, 1-propyl heptyl, 1,1-diethyl hexyl, 1,1-dipropyl butyl, 2-isopropyl 5-methyl hexyl, decyl radicals, e.g. n-decyl, dodecyl radicals, e.g. lauryl, tetradecyl radicals, e.g. myristyl and hexadecyl radicals, e.g. cetyl.

Typical examples of alkoxy-substituted alkyl radicals are propoxyethyl radicals, e.g. n-propoxyethyl, isopropoxyethyl; butoxyethyl radicals, e.g. n-butoxyethyl, isobutoxyethyl, tert-butoxyethyl; octoxyethyl radicals, e.g. n-octoxyethyl, diisobutoxyethyl; dibutoxypropyl radicals, e.g. 2,3-di-n-butoxypropyl, 3,3-diisobutoxypropyl; di-octoxypropyl and 2,3-bis(diisobutoxy)propyl.

Typical examples of alkylene and alkoxyalkylene radicals are methylene, ethylene, propylene, tetramethylene, pentamethylene, octamethylene, decamethylene, dodecamethylene, 4-methyl pentamethylene, 2-ethyl pentamethylene, 5-propyl octamethylene, 2-ethoxy propylene, 2-propoxy propylene, 2-ethoxy tetramethylene, 2-propoxy tetramethylene, 3-ethoxy pentamethylene, 3-propoxy pentamethylene, 3-butoxy pentamethylene, 4-ethoxy octamethylene and 4-ethoxy decamethylene.

Typical examples of perfluoro alkylene radicals are the above-illustrated alkylene radicals which are completely substituted with fluorine.

Typical examples of perfluoro alkylene ether-containing compounds which are incorporated into a base stock to prepare the functional fluid compositions of this invention are

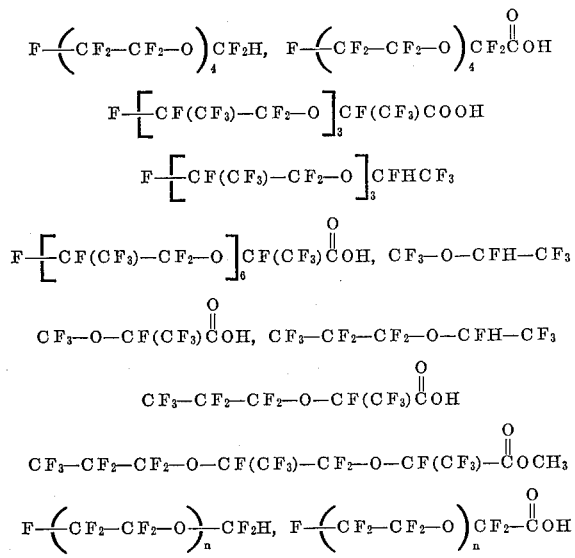

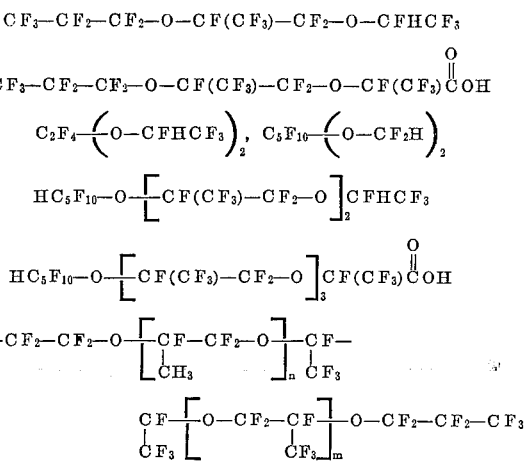

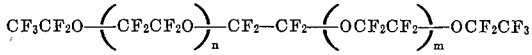

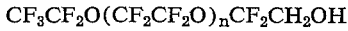

where $m$ and $n$ vary from 2 to 20, 2,3-bis(heptafluoropropoxy)octafluorobutane,

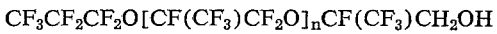

where $m$ and $n$ vary from 1 to 10, $CF_3CF_2O(CF_2CF_2O)_nCF_2CH_2OH$ where $n$ is 1 to about 50, $CF_3CF_2CF_2O[CF(CF_3)CF_2O]_nCF(CF_3)CH_2OH$ where $n$ is 1 to about 50, $CF_3CF_2CF_2O[CF(CF_3)CF_2O]_2CF(CF_3)CH_2OH$,
$CF_3CF_2CF_2OCF(CF_3)CF_2OCF(CF_3)CH_2OH$,
$CF_3CF_2OCF_2CF_2CF_2OCF_2CH_2OH$,
$CF_3CF_2CF_2O[CF(CF_3)CF_2O]_2CF(CF_3)CH_2OH$,
$CF_3CF_2O(CF_2CF_2O)_2CF_2CH_2OH$,
$CF_3CF_2O(CF_2CF_2O)_3CF_2CH_2OH$,

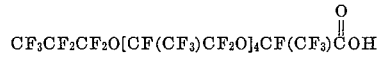

1,2,4,5—$C_6H_2[CO_2CH_2CF(CF_3)$
        $OCF_2CF(CF_3)OCF_2CF_2CF_3]_4$ 1,2,4,5—$C_6H_2[CO_2CH_2CF(CF_3)$
        $O(CF_2CF(CF_3)O)_2CF_2CF_2CF_3]_4$ $CF_3—CF_2—O—CF_2—CF_2—O—CF_2—COOH$, diethyl ether of tetrafluoroethylene glycol, dimethyl ether of octafluoro diethylene glycol, dimethyl ether of polyperfluoropropylene glycol containing 5 repeating units, diethyl ether of perfluoro propylene glycol containing 7 repeating units and a mixture of dimethyl ether perfluoro propylene glycol containing from 5 to 9 repeating units.

The perfluoro alkylene ether-containing compounds wherein $R_7$ is the residuum of an ester- or amide-forming compound and $R_9$ is the residuum of an alcohol-reacting compound containing as the preferred carbon atom ranges those carbon atom ranges as set forth above. The non-ester and non-amide forming part of $R_7$ and the non-alcohol reacting part of $R_9$ in general is a hydrocarbon radical which can be by way of example, alkyl, alkoxyalkyl, aralkyl, aroxyalkyl, aryl, aroxyaryl, alkoxyaryl, alkaryl and members of the above group further substituted with, for example, halogen, alkyl, nitro, cyano and alkoxy. With respect to the non-amide forming part of $R_7$, such non-amide forming part of $R_7$ can be hydrogen in which case the amide forming compound is ammonia. In the case where the amide forming compound is derived from a primary or secondary amine, one or two hydrocarbon radicals represent the non-amide forming part of $R_7$. The hydrocarbon radical as set forth above is a non-critical feature of this invention and is defined in its broadest sense as encompassing the various radicals described above and in addition those radicals described above which are substituted with other materials such as alkoxy and halogen. The hydrocarbon radical is further defined as a radical which is non-interfering with respect to the damage inhibiting function of the perfluror alkylene ether-containing compound.

The aforedescribed perfluoro alkylene ether-containing compounds weherein $R_6$ is

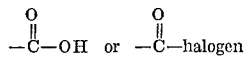

can be interacted with, for example, a carbon-containing alcohol or amine to produce perfluoro alkylene ether-containing compounds wherein $R_7$ is the residue of an ester or amide forming compound. The alcohol and amine compounds can contain one or more hydrxyl or amin groups, respectively or combination of both groups. Thus, for example, the carbon-containing alcohol can be a polyhydroxyl compound such as a propylene glycol or pentaerythritol. In addition, the amine compound can contain one or more amino groups such as ethylenediamine or N,N'-dimethyl ethylenediamine. The preferred alcohol and amine compounds have as the preferred carbon atom ranges those carbon atom ranges as set forth above. In addition it is preferred that the alcohols and amines be substantially free of olefinic or acetylenic unsaturation.

Typical examples of alcohols are methyl alcohol, ethyl alcohol, n-propyl alcohol, isopropyl alcohol, allyl alcohol, n-butyl alcohol, isobutyl alcohol, sec-butyl alcohol, tert-butyl alchol, n-amyl alcohol, isoamyl alcohol, tert-amyl alcohol, n-hexyl alcohol, cyclohexanol, n-octyl alcohol, capryl alcohol (octanol-2), n-decyl alcohol, lauryl alcohol, myristiyl alcohol, cetyl alcohol, stearyl alcohol, benzyl alcohol, ethylene glycol, propylene glycol, trimethylol propane, neopentyl glycol, pentaerythritol, p-octylbenzyl alcohol, p-propoxybenzyl alcohol, p-decylbenzyl alcohol and tetrahydro furfuryl alcohol.

Typical examples of amines are methylamine, dimethylamine, ethylamine, diethylamine, n-propylamine, di-n-propylamine, n-butylamine, n-amylamine, n-hexylamine, laurylamine, diamylamine, dihexylamine, didecylamine, hexamethylenediamine, ethanol amine, diethanol amine and aniline. In addition, ammonia can be used as the reactant to form an ammonia salt, that is, $R_6$ is

The aforedescribed perfluoro alkylene ether-containing compounds wherein $R_6$ is —$CH_2$—OH can be interacted with an alcohol-reacting compound to produce perfluoro alkylene ether-containing compounds wherein $R_9$ is the residue of an alcohol-reacting compound. The various alcohol-reacting compounds that can be utilized are, for example, boron acids, Group IV–A acids, Group V–A acids and carbon-containing aliphatic, aromatic, heterocyclic, mono- and polycarboxylic acids. The preferred alcohol-reacting compounds are those within the carbon atom range as set forth above. The most particularly preferred alcohol-reacting compounds are those acids which contain no olefinic or acetylenic unsaturation.

Typical examples of alcohol-reacting compounds are Group III–A containing acids such as diethyl-p-hydroxybenzene boronic acid, boric acid, metaboric acid; Group IV–A-containing acids such as p-triphenyl silyl benzoic acid, p-(triphenyl silyl) propionic acid, triethyl silyl benzoic acid, 4,4'-(trimethyl disiloxanylene) dibenzoic acid, p-triphenyl stannyl benzoic acid, p-trimethyl plumbyl benzoic acid, phenyl plumbonic acid; Group V–A-containing acids such as phosphorus acids and hydrocarbon-cantaining esters and amides of an acid of phosphorus, which include, by example, phosphoric acids, thiophosphoric acids, phosphinic acids, thiophosphinic acids, phosphonic acids, thiophosphonic acids and the like, dialkyl phosphoric acids, dialkyl dithiophosphoric acids, dicyclohexyl phosphoric acids, dimethylcyclohexyl phosphoric acids, di-2-phenylhexyl phosphoric acids, diphenyl phosphoric acids and di-N-dodecylphenyl phosphoric acids.

Additional examples of alcohol-reacting compounds are carboxylic acids, typical examples of which are:

(a) Aliphatic monocarboxylic acids

Formic acid, butyric acid, isobutyric acid, nitroisobutyric acid, valeric acid, isovaleric acid, hexanoic acid, heptanoic acid, 2-ethylhexanoic acid, nonanoic acid, decanoic acid, dodecanoic acid, undecanoic acid, hexadecanoic acid, heptadecanoic acid, octadecanoic acid, eicosanoic acid, docosanoic acid triacontanoic acid, butenoic acid, pentenoic acid, hexenoic acid, teracrylic acid, hypogaeic acid, elaidic acid, linoleic acid, alpha-eleostearic acid, alpha-linolenic acid, acrylic acid, methacrylic acid, crotonic acid, isocrotonic acid 3-butenoic acid, angelic acid, senecioic acid, hydrosorbic acid, sorbic acid and 4-tetradecenoic acid.

(b) Alicyclic monocarboxylic acids

Cyclopropanecarboxylic acid, cyclopentane-carboxylic acid, hydrocarpic acid, chaulmoogric acid, naphthneic acid, 2,3,4,5-tetrahydrobenzoic acid and cyclodencanecarboxylic acid.

(c) Aromatic monocarboxylic acids 1-naphthoic acid, 2-naphthoic acid, o-toluic acid, m-toluic acid, p-toluic acid, o-nitrobenzoic acid, m-nitrobenzoic acid, p-nitrobenzoic acid, 2,3-dinitrobenzoic acid, m-hydroxybenzoic acid, p-hydroxybenzoic acid, gallic acid, anisic acid and beta-phenylpropionic acid.

(d) Heterocyclic monocarboxylic acids

Picolinic acid, nicotinic acid, furylacrylic acid, piperic acid, indoxylic acid, 3-indoleacetic acid, cinchoninic acid, furoic acid, 2-thiophenecarboxylic acid, 2-pyrrolecarboxylic acid, 9-acridancarboxylic acid, quinaldic acid, pyrazionic acid and antipyric acid.

(e) Aliphatic polycarboxylic acids

Oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, citraconic acid, itaconic acid, ethidenemalonic acid, mesaconic acid, allylmalonic acid, allylsuccinic acid, teraconic acid, exeronic acid, cetylmalonic acid, pyromellitic and trimellitic acid.

It is also contemplated herein to employ dimeric and trimeric polycarboxylic acid. When two like or unlike molecules of a polyethenoid monocarboxylic fatty acid condense to form a dicarboxylic acid, the product by definition is a dimer acid, or the carboxylic acid is said to be dimerized. In general, the dimer acids suitable for use in this invention are produced by the condensation of two like or unlike unsaturated aliphatic monocarboxylic acids having between about 16 and about 18 carbon atoms per molecule, examples of which comprise $\Delta^{9,11}$-hexadecadienoic acid
$\Delta^{9,12}$-heptadecadienoic acid
$\Delta^{8,12}$-octadecadienoic acid
$\Delta^{9,11}$-octadecadienoic acid
$\Delta^{9,12}$-octadecadienoic acid (linoleic acid)
$\Delta^{9,13}$-octadecadienoic acid
$\Delta^{9,11,13}$-octadecatrienoic acid
$\Delta^{9,12,15}$-octadecatrienoic acid (linolenic acid).

The following base stocks are only illustrative of typical base stocks that can be utilized in preparing the functional fluid compositions of this invention and the instant invention can be practiced utilizing various modifications of the base stock which are set forth below.

Typical examples of hydrocarbon phosphorus esters and hydrocarbon phosphorus amides which are suitable as base stocks for preparing the functional fluid compositions of this invention are those represented by the structure

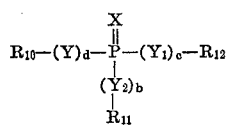

wherein Y is selected from the group consisting of oxygen, sulfur, and

$Y_1$ is selected from the group consisting of oxygen, sulfur and

and $Y_2$ is selected from the group consisting of oxygen, sulfur and

$R_{10}$, $R_{11}$, $R_{12}$, $R_{13}$, $R_{14}$ and $R_{15}$ are hydrocarbon radicals, X is selected from the group consisting of sulfur and oxygen and $b$, $c$, and $d$ are whole numbers having a value of 0 to 1 and the sum of $b+c+d$ is from 1 to 3. These compounds within the generic formula can be prepared by the prior art methods for preparing esters of phosphorus and amides of phosphorus.

The various base stocks illustrated by the above generic formula can be varied widely with respect to the use of different hydrocarbon radicals. Examples of various radicals included within the term "hydrocarbon radical" are alkyl, alkoxyalkyl, aralkyl, aroxyalkyl, aryl aroxyaryl, alkoxyaryl, alkaryl and the members of the above group further substituted with halogen and/or alkyl. The various base stocks set forth above in general have hydrocarbon radicals which contain up to about 18 carbon atoms. The particular hydrocarbon radical can be varied over a wide range with respect to the number of carbon atoms. The particular hydrocarbon radical can be varied with respect to the type of radical, that is, for example, alkyl, aryl and alkaryl, in order to adjust the fluid properties of a single base stock and in addition to adjust the fluid properties when the base stock comprises a blend of various base stocks. In general such hydrocarbon radicals which are preferred are alkyl, aryl and alkaryl representing $R_{10}$, $R_{11}$, and $R_{12}$ when Y, $Y_1$ and $Y_2$ are oxygen respectively and alkyl representing $R_{10}$, $R_{11}$, $R_{12}$, $R_{13}$, $R_{14}$ and $R_{15}$ when Y, $Y_1$ and $Y_2$ are

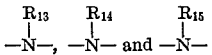

respectively.

Typical examples of aralkyl radicals, e.g. aryl and alkylaryl-substituted alkyl radicals, are benzyl methylbenzyl, caprylbenzyl, diisobutylbenzyl, phenylethyl, phenylethyl, phenylpropyl, xenyl- and alkyenyl-substituted alkyl radicals, e.g. xenylmethyl, caprylxenylmethyl, xenylethyl, diisobutylxenylmethyl. Typical examples of alkyl- and oxygen-containing alkyl radicals, e.g. alkoxy-substituted alkyl radicals, are illustrated above. Typical examples of aroxy-substituted alkyl radicals are, for example, phenoxy- and alkylphenoxy-substituted alkyl radicals, e.g. phenoxymethyl, phenoxyethyl, propylphenoxyethyl, and caprylphenoxyethyl. Typical examples of aryl, alkoxyaryl, aroxyaryl and halo and alkyl derivatives thereof are phenyl, cresyl, xylyl, mesityl, ethylphenyl, diethylphenyl, isopropylphenyl, n-propylpenyl, tert-butylphenyl, di-tert-butylphenyl, isobutylphenyl, n-butylphenyl, tert-amylphenyl, cyclohexylphenyl, methylcyclohexylphenyl, caprylphenyl, diisobutylphenyl, monochlorophenyl, dichlorophenyl, methoxyphenyl, xenyl, mono- and polychloroxenyl, caprylxenyl, phenoxyphenyl, thiophenoxyphenyl, di- isobutylphenoxyphenyl, and methyldichlorophenyl radicals.

The preferred hydrocarbon phosphorus ester base stocks are hydrocarbon phosphates and include trialkyl phosphates, triaryl and/or substituted aryl phosphates and mixed aryl and/or substituted-arylalkyl phosphates. One or more substituents, preferably no more than 2, can be attached to the aryl radical and include by way of example halogen, alkyl, haloalkyl and aroxy. Preferred substituents on the aryl group are halo and alkyl and with respect to the halo atom it is preferred that such halo atom be chloro and/or bromo and occupy the meta position. In addition, the above three groups of phosphate base stocks can be defined by the number of carbon atoms present in the alkyl group and the aryl and substituted-aryl group, respectively, and with respect to the alkyl groups, it is preferred to have from about 2 to about 18 carbon atoms, more preferably from about 2 to about 12 carbon atoms and with respect to the number of carbon atoms present in the aryl and substituted aryl groups, it is preferred to have from about 6 to about 16 carbon atoms and more preferably from about 6 to 12 carbon atoms. Typical examples of the above three groups of phosphates are those phosphates represented by the generic formula as set forth above utilizing alkyl, alkaryl, haloaryl, haloalkaryl and aroxyaryl radicals as illustrated above. Additional typical examples of phosphates are dibutylphenyl phosphate, triphenyl phosphate, tricresyl phosphate, tributyl phosphate, tri-2-ethylhexyl phosphate, trioctyl phospate and mixtures of the above phosphates, such as mixtures of tributyl phosphate and tricresyl phosphate and mixtures of isooctyldiphenyl phosphate and 2-ethylhexyldiphenyl phosphate and mixtures of trialkyl phosphates and tricresyl phosphates and the like.

The preferred amides of an acid of phosphorus are those compounds wherein $b$, $c$ and $d$ have a value of 1, Y and $Y_1$ are selected from oxygen and

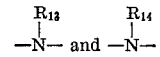

respectively and $Y_2$ is

These base stocks are referred to generically as amides of phosphorus and include hydrocarbon phosphoroamidates, hydrocarbon phosphorodiamidates and hydrocarbon phosphorotriamidates. The preferred class of mono-, di- and triphosphoroamidates are the diaryl- and/or substituted-aryl-N,N-dialkylphosphoroamidates, aryl- and/or substituted-aryl - N,N - dialkyl-N',N'-dialkylphosphorodiamidates and the N,N - dialkyl - N',N' - dialkyl-N'',N''-dialkylphosphorotriamidates. The substituents attached to the aryl radical include by way of example halogen, alkyl, haloalkyl and aroxy. The preferred substituents on the aryl group are halogen, alkyl and haloalkyl and with respect to the halogen atom, it is preferred that such halogen atom be chloro or bromo and occupy the meta position. In addition, the mono-, di- and triphosphoroamidates can be defined by the number of carbon atoms present in the alkyl group, the aryl group and the substituted aryl group, respectively, and with respect to the alkyl group, it is preferred to have from about 1 to about 18 carbon atoms, more preferably from about 1 to about 8 carbon atoms and with respect to the number of carbon atoms present in the aryl and substituted-aryl group, it is preferred to have from 6 to about 16 carbon atoms, and preferably from 6 to about 12 carbon atoms. Examples of the mono-, di- and triphosphoroamidates are those compounds represented by the generic formula as set forth above utilizing alkyl, alkaryl, haloaryl, haloalkaryl and aroxy-aryl radicals as illustrated above. Typical examples of the amides of an acid of phosphorus, that is, mono-, di- and triamides of an acid of phosphorus, are phenyl-methyl-N,N-dimethylphosphoroamidate,
phenyl-methyl-N,N-di-n-butylphosphoroamidate,
mixtures of m-cresyl-p-cresyl-N,N-dimethylphosphoroamidate and
phenyl-p-cresyl-N,N-dimethylphosphoroamidate,
mixture of m-cresyl-p-cresyl-N,N-dimethylphosphoroamidate,
di-m-cresyl-N,N-dimethylphosphoroamidate,
di-p-cresyl-N,N-dimethylphosphoroamidate,
di-m-bromophenyl-N-methyl-N-n-butylphosphoroamidate,
di-m-chlorophenyl-N-methyl-N-n-butylphosphoroamidate,
di-alpha,alpha,alpha-trifluoro-m-cresyl-N-methyl-N-n-butylphosphoroamidate,
di-p-bromophenyl-N-methyl-N-n-isoamylphosphoroamidate,
di-p-chlorophenyl-N-methyl-N-n-isoamylphosphoroamidate,
p-chlorophenyl-m-bromophenyl-N-methyl-N-n-isoamylphosphoroamidate,
phenyl-N-methyl-N-butyl-N'-methyl-N'-butyl-phosphorodiamidate,
phenyl-N,N-di-n-butyl-N',N'-di-n-butylphosphorodiamidate,
phenyl-N,N-dimethyl-N',N'-dimethylphosphorodiamidate,
m-chlorophenyl-N-methyl-N-n-butyl-N'-methyl-N'-n-butylphosphorodiamidate,
m-bromophenyl-N-methyl-N-n-butyl-N'-methyl-N'-n-butyl-N'-methyl-N'-n-butylphosphorodiamidate,
p-chlorophenyl-N-methyl-N-isobutyl-N'-methyl-N'-isoamylphosphorodiamidate,
p-bromophenyl-N-methyl-N-isobutyl-N'-methyl-N'-isoamylphosphorodiamidate,
N-methyl-N-butyl-N'-methyl-N'-butyl-N''-butyl-phosphorotriamidate,
N-methyl-N-butyl-N',N''-tetramethylphosphorotriamidate,
N-di-n-propyl-N',N''-tetramethylphosphorotriamidate and
N,N'-di-n-propyl-N''-dimethylphosphorotriamidate.

Typical examples of phosphinate esters are phenyl-di-n-propyl phosphinate,
phenyl-di-n-butyl phosphinate,
phenyl-di-sec-butyl phosphinate,
phenyl-di-n-pentyl phosphinate,
phenyl-di-neopentyl phosphinate,
phenyl-di-n-hexyl phosphinate,
phenyl-di-n-butyl thiophosphinate,
p-methoxyphenyl-di-n-butyl phosphinate,
m-chlorophenyl-di-n-butyl phosphinate,
phenyl-(n-propyl-n-pentyl) phosphinate,
phenyl-(n-propyl-n-butyl) phosphinate,
phenyl-(n-propyl-n-hexyl) phosphinate,
phenyl-(n-butyl-n-pentyl) phosphinate,
phenyl-(n-butyl-n-hexyl) phosphinate,
phenyl-(n-pentyl-n-hexyl) phosphinate,
phenyl-(neopentyl-n-propyl) phosphinate,
phenyl-(neopentyl-n-butyl) phosphinate,
phenyl-(neopentyl-n-hexyl) phosphinate,
thiophenyl-di-n-propyl phosphinate,
thiophenyl-di-n-pentyl phosphinate,
cresyl-di-n-pentyl phosphinate,
tert-butylphenyl-di-n-butyl phosphinate,
n-butylphenyl-di-n-butyl phosphinate,
sec-butylphenyl-di-n-butyl phosphinate,
ethylphenyl-di-n-butyl phosphinate,
xylyl-di-n-butyl phosphinate,
thiophenyl-di-n-hexyl phosphinate,
thiophenyl-di-n-butyl phosphinate,
thiophenyl-di-n-propyl thiophosphinate,
thiophenyl-di-n-butyl thiophosphinate,
thiophenyl-di-n-pentyl thiophosphinate,
thiophenyl-di-n-hexyl thiophosphinate,
thiophenyl-(n-propyl-n-butyl) phosphinate,
thiophenyl-(propyl-n-pentyl) phosphinate,
thiophenyl-(n-propyl-n-hexyl) phosphinate,
thiophenyl-(n-butyl-n-pentyl) phosphinate,
thiophenyl-(n-butyl-n-hexyl) phosphinate,
thiophenyl-(n-pentyl-n-hexyl) phosphinate,
thiophenyl-(n-propyl-n-butyl) thiophosphinate,
thiophenyl-(n-propyl-n-pentyl) thiophosphinate,
thiophenyl-(n-propyl-n-hexyl) thiophosphinate,
thiophenyl-(n-butyl-n-pentyl) thiophosphinate,
thiophenyl-(n-butyl-n-hexyl) thiophosphinate and
thiophenyl-(n-pentyl-n-hexyl) thiophosphinate.

Typical examples of orthosilicates and alkoxy polysiloxanes which can be utilized as base stocks for preparing compositions of this invention are those base stocks represented by the structural formula

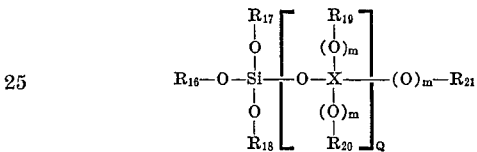

wherein $R_{16}$, $R_{17}$ and $R_{18}$ are each independently selected from alkyl, alkoxyalkyl, aryl, alkaryl and members of the above group further substituted with halogen, O is oxygen, Si is silicon, X is a member of the group consisting of carbon and silicon, $m$ is a whole number having a value of 0 or 1, Q is an integer having a value of from 1 to about 200 or more and when X is carbon $m$ is 0, Q is 1 and $R_{19}$, $R_{20}$ and $R_{21}$ are each selected from hydrogen and a member of the group representing $R_{16}$ and when X is silicon $m$ is 1, Q is an integer having a value of from 1 to about 200 or more. It is preferred that the percentage of radicals based upon the sum of all of the radicals represented by $R_{16}$, $R_{17}$, $R_{18}$, $R_{19}$, $R_{20}$ and $R_{21}$ which are hydrogen be less than 10 percent and even more preferably less than 2 percent.

Typical examples of alkyl, alkoxyalkyl, aryl, alkaryl and members of this group further substituted with halogen are illustrated above.

Typical examples of orthosilicates useful as base stocks include the tetraalkyl orthosilicates such as tetra-(octyl)-orthosilicates, tetra(2-ethylhexyl)orthosilicates and the tetra(isooctyl)orthosilicates and those in which the isooctyl radicals are obtained from isooctyl alcohol which is derived from the oxo process, and the (trialkoxysilico)-trialkyl orthosilicates, otherwise referred to as hexa-(alkoxy) disiloxanes, such as hexa(2-ethylbutoxy) disiloxane and hexa(2-ethylhexoxy) disiloxane.

The preferred tetraalkyl orthosilicates and hexa-(alkoxy) disiloxanes are those in which the alkyl or alkoxy radicals have from 4 to 12 carbon atoms and in which the total number of carbon atoms in the orthosilicate is from 16 to 60.

In addition to the hexa(alkoxy) disiloxanes referred to above, other preferred hexa(alkoxy) disiloxanes are those in which the alkyl radical of the alkoxy groups are selected from 1-ethylpropyl, 1,3-dimethylbutyl, 2-methylpentyl, 1-methylhexyl, 1-ethylpentyl, 2-butylhexyl and 1-methyl-4-ethyloctyl.

Typical examples of the siloxanes or silicones which are useful as base stocks are those base stocks represented by the structural formula

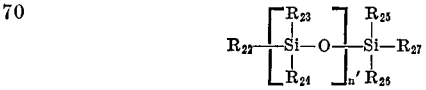

wherein $R_{22}$, $R_{23}$, $R_{24}$, $R_{25}$, $R_{26}$ and $R_{27}$ are each independently selected from hydroxyl, alkyl, alkoxyalkyl, aralkyl, aryl, alkaryl and members of the about group further substituted with halogen and $n'$ is a whole number from about 0 to about 200 or more. Typical examples of alkyl, alkoxyalkyl, aralkyl, aryl, alkaryl and members of this group further substituted with halogen are illustrated above. With respect to the radicals defined above, it is preferred that the radicals be selected from alkyl and haloalkyl having from 1 to 4 carbon atoms and aryl, alkaryl, haloaryl and haloalkaryl having from 6 to 10 carbon atoms. In addition it is preferred that the percentage of radicals based upon the sum of all of the radicals represented by $R_{22}$, $R_{23}$, $R_{24}$, $R_{25}$, $R_{26}$ and $R_{27}$ which are hydroxyl be less than 5% and even more preferably less than 2%. Typical examples of the siloxanes are poly(methyl) siloxane, poly(methyl, phenyl) siloxane, poly(methyl, chlorophenyl) siloxane and poly(methyl, 3,3,3-trifluoropropyl) siloxane.

Other typical examples of base stocks which are useful in preparing compositions of this invention are mono- and dialkylthiophenes, which term as used herein includes cycloalkyl-containing thiophene compounds. Typical examples of thiophenes are 2,4-di(1-hexyl-1-methylnonyl)thiophene,
2,4-di(1-hexyl-1-methylnonyl)thiophene,
2,4-di(tert-butylthiophene),
2,5-di(tert-butylthiophene),
2,5-di(1,1-dimethylpropyl)thiophene,
2,5-di(1-butyl-1-octylnonyl)thiophene,
2,5-di(1-propylcyclobutyl)thiophene,
2-tert-butyl-4-(1-octyl-1-methyloctadecyl)thiophene,
2,5-di(1-methylcyclohexyl)thiophene,
2,5-di(1-octyl-1-methyldecyl)thiophene,
2,5-di(1,1-dimethyltridecyl) thiophene,
2,3-di(1,1-dimethyltridecyl)thiophene,
2,4-di-(1,1-dimethyltridecyl)thiophene,
2,4-di(1-methylcyclopentyl)triopene
and 2,5-di(1-n-dodecylpentyl)thiophene.

An additional class of base stocks which can be utilized to prepare compositions of this invention are blends of hydrocarbon phosphorus esters and/or hydrocarbon phosphorus amides with halogenated blending agents. It is preferred to have from about 20 to about 80% by weight of at least one member of the aforedescribed base stocks and from about 20 to about 80% by weight of a blending agent. Included within the term "blending agent" are halodiphenyl ethers, halophenoxy pyridines, halobenzenes, haloalkylated benzenes, perhalodienes, perhalocyclicdienes, halonaphthalenes, and halogenated polyphenyls. Typical examples of the hydrocarbon phosphorus esters, hydrocarbon phosphorus amides and the preferred base stocks within these classes of base stocks are illustrated above. The preferred base stocks illustrated above are in addition preferred in preparing this present base stock which includes a halogenated blending agent. Typical examples of monohalodiphenyl ethers and halogenated naphthalenes are 3-chlorodiphenyl ether, 3-bromodiphenyl ether, 1-chloronaphthalenes and 1-bromonaphthalenes.

Additional examples of halogenated blending agents are the halogenated lower alkyl ($C_{2-4}$) benzenes containing 1 to 5 halogens, such as 4-bromomethylbenzene, 2-bromoethylbenzene, 4-bromopropylbenzene, 4-chlorobutylbenzene, 2,4-dichloromethylbenzene, 2,3-dibromoethylbenzene, 2,4 - dibromoethylbenzene, 2,4 - dichloroethylbenzene, 2 - bromo - 4 - chloroethylbenzene, 2,5-dibromoethylbenzene, 3,4 - dibromoethylbenzene, 3,5 - dibromopropylbenzene, 2,4-dichlorobutylbenzene and the like. Further examples of halogenated alkyl benzenes are tri- and tetrachloroethylbenzene, tri- and tetrabromoethylbenzene, pentachloromethylbenzene, pentachloroethylbenzene, pentabromoethylbenzene, pentabromopropylbenzene, pentachlorobutylbenzene and the like.

In addition to the use of specific compounds, there can be used a mixture of halogenated alkylbenzenes such as the mixture of halogenated ethylbenzenes disclosed in United States Pat. No. 2,257,903, which contain an average of two atoms of bromine per mole of ethylbenzene. The mixture of Example 1 of United States Pat. No. 2,257,903 is particularly preferred for use in the fluids of this invention because of its low crystallizing point.

Typical examples of halobenzenes useful as blending agents are o-dibromobenzene,
1-bromo-3-chlorobenzene,
1,3-dichloro-5-bromobenzene,
1,3-difluoro-5-bromobenzene,
1-fluoro-3-chloro-5-bromobenzene,
1,2,3,4-tetrachloro-5-bromobenzene,
1,2,3,4-tetrafluoro-5-bromobenzene,
1,3-dibromo-5-chlorobenzene,
1,3-dibromo-4,6-difluorobenzene,
hexafluorobenzene,
hexachlorobenzene,
and preferably
m-dibromobenzene.

Typical examples of perhalodienes and perhalocyclodienes useful as blending agents are those compounds having at least 4 to about 8 carbon atoms in the molecule for the perhalodienes and 5 to 8 carbon atoms for the perhalocyclodienes. Typical perhalodienes are perchlorobutadiene, perbromobutadiene, perfluorobutadiene, perchloropentadiene, perfluoropentadiene, perbromopentadiene, perchlorooctadiene, perbromooctadiene and perfluorooctadiene. Perchlorobutadiene is preferred. Typical perhalocyclodienes are perbromocyclopentadiene, perfluorocyclopentadiene, perchlorocyclohexadiene, perbromocyclohexadiene, perchlorocycloheptadiene, perchlorocyclooctadiene and perfluorocyclooctadiene.

Another blending agent which can be utilized in preparing the compositions of this invention are halogenated biphenyl compounds having from 20 to 61% by weight combined chlorine. Typical examples of halogenated biphenyl compounds are those which contain chlorine or bromine or combinations thereof in amounts corresponding to mono-, di-, tri-, tetra-, penta- and hexahalobiphenyl. Typical of such biphenyl compounds are the chlorinated biphenyls commercially available as products containing 32%, 42%, 48%, 54% and 60% by weight of combined chlorine. The expression halogenated biphenyl containing a stated percentage of combined halogen is used herein as including the directly halogenated products, halogenated products containing more than one specie of halogen in the same molecule and blends of one or more of such halogenated products whereby the halogen content is broadly within the range of about 30% to 60%, preferably within the range of about 30% to 42% by weight.

Additional typical examples of blending agents are 2-bromo-2'-chlorodiphenyl ether,
2-bromo-2'-chlorodiphenyl sulfide,
2-bromo-3'-chlorodiphenyl ether,
2-bromo-3'-chlorodiphenyl sulfide,
2-bromo-4'-chlorodiphenyl ether,
2-bromo-4'-chlorodiphenyl sulfide,
3-bromo-2'-chlorodiphenyl ether,
3-bromo-2'-chlorodiphenyl sulfide,
3-bromo-3'-chlorodiphenyl ether,
3-bromo-3'-chlorodiphenyl sulfide,
3-bromo-3'-chlorodiphenyl ether,
3-bromo-4'-chlorodiphenyl sulfide,
4-bromo-3'-chlorodiphenyl ether,
4-bromo-3'-chlorodiphenyl sulfide,
4-bromo-4'-chlorodiphenyl ether,
4-bromo-4'-chlorodiphenyl sulfide,
4-bromo-2'-chlorodiphenyl ether,
4-bromo-2'-chlorodiphenyl sulfide,
2,2'-dibromodiphenyl ether,
2,2'-dibromodiphenyl sulfide, 2,3'-dibromodiphenyl ether,
2,3'-dibromodiphenyl sulfide,
2,4'-dibromodiphenyl ether,
2,4'-dibromodiphenyl sulfide,
3,3'-dibromodiphenyl ether,
3,3'-dibromodiphenyl sulfide,
3,4'-dibromodiphenyl ether,
3,4'-dibromodiphenyl sulfide,
4,4'-dibromodiphenyl ether,
4,4'-dibromodiphenyl slufide,
2,2'-dichlorodiphenyl ether,
2,2'-dichlorodiphenyl sulfide,
2,3'-dichlorodiphenyl ether,
2,3'-dichlorodiphenyl sulfide,
2,4'-dichlorodiphenyl ether,
2,4'-dichlorodiphenyl sulfide,
3,3'-dichlorodiphenyl ether,
3,3'-dichlorodiphenyl sulfide,
3,4'-dichlorodiphenyl ether,
3,4'-dichlorodiphenyl sulfide,
4,4'-dichlorodiphenyl ether, and
4,4'-dichlorodiphenyl sulfide.

The halodiphenyl ethers are generally preferred over the sulfides because their lower melting points make them usable in a wider number of applications and of the ethers, those in which the halogen substituents are in the 3,4'-relationship are preferred for use in the compositions of this invention, because their low melting points are the lowest of all the ethers.

The pyridine derivatives can be prepared by (1) reacting an alkali metal salt of a 3-hydroxypyridine with halogenated benzene or conversely by (2) reacting an alkali metal salt of a phenol with a halogenated pyridine in which there is a halogen in the 3-position. For the compounds where A is S, that is, 3-phenylmercaptopyridines, the same general procedures are used except that in procedure (1) a 3-mercaptopyridine is substituted for the 3-hydroxypyridine, and in procedure (2) a thiophenol is substituted for a phenol. To facilitate preparation of both classes of compounds an inert solvent can be used.

Examples of pyridine derivatives useful in compositions of this invention are 3-(2'-bromophenoxy)pyridine, 3-(3'-bromophenoxy)pyridine, 3-(4'-bromophenoxy)pyridine, 3-(3' - fluorophenoxy)pyridine, 3 - (3' - chlorophenylmercapto) - 5 - chloropyridine and 3 - (4' - chlorophenylmercapto)-5-chloropyridine.

It is also contemplated within the scope of this invention that mixtures of individual base stocks which are included in a generic type of base stock can be utilized as a single base stock. For example, two different hydrocarbon phosphorus esters can be blended together to form a single base stock. In addition, it is contemplated within the scope of this invention that two base stocks within different various generic types of base stocks can be blended together to form a base stock. Thus, a hydrocarbon phosphorus amide, such as an N,N,N',N'-tetralkylphenylphosphorodiamide, can be blended together with, for example, a dialkylphenyl phosphate to form a base stock. In general, base stocks within a generic description of a base stock as well as blends of 2 different types of base stocks within different generic type base stocks can be blended together in proportions varying, for example, from 10 to 90% by weight, from 15 to 85% by weight and from 35 to 65% by weight of each individual base stock.

The invention can be better appreciated by the following non-limiting examples. In Examples 1 through 13 a nickel specimen was immersed in the fluid and a 20 kilocycle vibration induced into the specimen. The temperature of the fluid was 85° C. and the test duration was 45 minutes. Relative weight loss is defined to mean the total weight loss of the metal specimen when tested in a fluid containing the additive present divided by the weight loss of the metal specimen when the neat fluid is tested without any additive present, times 100.

TABLE I

| Example No. | Additive | Fluid composition | Weight percent | Relative damage |
|---|---|---|---|---|
| 1 | $CF_3CF_2-CF_2-O-CFHCF_3$ | 87.5% dibutylphenyl phosphate, 11% acryloid VI improver, 1% epoxidized hydrocarbon, 0.5% aromatic mercaptan compound. | 2.0 | 63 |
| 2 | Same as above | do | 3.0 | 47 |
| 3 | do | do | 4.0 | 39 |
| 4 | do | do | 5.0 | 26 |
| 5 | $F-[CF(CF_3)-CF_2-O]_2-CFHCF_3$ | do | 3 | 83 |
| 6 | Same as above | do | 4 | 70 |
| 7 | do | do | 5 | 59 |
| 8 | $F-[CF(CF_3)-CF_2-O]_3-CFHCF_3$ | do | 2.5 | 87 |
| 9 | $F-[CF(CF_3)-CF_2-O]_4-CFHCF_3$ | do | 0.5 | 88 |
| 10 | $F-[CF(CF_3)-CF_2-O]_5-CFHCF_3$ | do | 0.04 | 89 |
| 11 | $CF_3CF_2-CF_2-O-CFHCF_3$ | N-methyl-N-butyl-N'-methyl-N'-butylphenyl-phosphorodiamidate. | 5 | 37 |
| 12 | Same as above | Tetraisopropyl silicate | 5 | 37 |
| 13 | do | 40% hydrocarbon oil, 24% o-xenyl diphenyl phosphate, 35% m-dibromobenzene, 1% of a phenolic antioxidant and a heterocyclic amine corrosion inhibitor. | 2.5 | 56.1 |

The test method as employed to determine relative damage has been found to correlate quite well with actual test runs on simulated hydraulic system test stands, such as the Fairey Test Stand, and has correlated quite well with the hydraulic system of commercial aircraft where damage levels have been determined. The test results obtained in Table I demonstrate that functional fluid compositions of this invention having incorporated therein a perfluoro alkylene ether-containing compound control and inhibit damage to mechanical members in contact with said functional fluid. Thus relative damage rates as low as 26% or even more are obtainable using the perfluoro alkylene ether-containing compounds in functional fluids.

It is believed that the cause of cavitation damage in aircraft hydraulic systems is by a pressure excursion process whereby the fluid pressure dips below fluid bubble point pressure. In the case where the fluid pressure dips below the fluid bubble point pressure, damage on the return side of the cycle, that is, the side where a high pressure is again encountered, is observed. The pressure excursion process for aircraft hydraulic systems appears to be initiated by simple acceleration of flow through a restricted passage from high to low pressure. Damage has been observed in the valve porting areas on servo valves, electrical depressurizing valves in pumps, pressure regulating valves, poppet relief valves, solenoid valves, check valves (ball or poppet) and in general wherever a large pressure drop exists across a short seating region, that is, for example, the seating region where a valve seats in the pump. The cavitation damaged area that is seen in valve porting areas on microscopic analysis has the following appearance: jagged, cinder-like, irregular, rough, undermined, peak-valley and cavities. The damage observed by microscopic analysis does not exhibit coloration or pitting such as would be found by corrosion, gouges, scratches such as would be exhibited by machining, fatigue spalling such as would be observed by the sudden removal by large particles, particle erosion which would be exhibited by smooth and rounded edges or by wear wherein microscoring and metal transfer is observed. Thus, damage in a hydraulic system and in particular aircraft hydraulic systems which is subject to cavitation damage can be determined by comparing under microscopic examination damaged areas of valves with similar valves which are subject to the phenomenon of wear, fatigue spalling, corrosion, machining and particle erosion. In addition, valves undergoing damage by the process of cavitation can be compared with known specimen which have been subjected to induced cavitation damage. An example of this type of a comparison is a comparison of damaged metal tips in the vibrating probe with damaged valves from a hydraulic system. A comparison of this type can demonstrate damage in a hydraulic system since the vibrating probe gives a characteristic damage spectrum which is exhibited by valves in a hydraulic system.

In addition to comparison with the vibrating probe, cavitation damage can be generated using a cavitating orifice test apparatus. This apparatus simulates actual aircraft hydraulic systems by passing a fluid through a restriction, which subjects the fluid to the requisite changes thereby generating cavitation damage on a metal specimen. The orifice test is illustrated in application Ser. No. 612,622 and now abandoned. Thus, the damage that is generated on a metal specimen utilizing the orifice test apparatus can be compared to actual valves from aircraft hydraulic systems and the determination made as to whether or not that particular hydraulic system is subject to cavitation damage.

In addition, apparatus have been invented which determine the leakage rate through valves in hydraulic systems and in particular aircraft hydrauilc systems. These apparatus are referred to as leak detectors and can determine leakage rates in aircraft hydraulic systems. In addition, leakage rates can be continually monitored over a period of time. Thus, aircraft hydraulic systems which are subject to cavitation damage will exhibit increased leakage rates over a period of time as the geometry of the valve is altered through cavitation damage. It has been found that aircraft hydraulic systems operating utilizing functional fluid compositions of this invention when compared to aircraft hydraulic systems not using functional fluid compositions of this invention exhibit reduced leakage rates as a function of time based upon the above comparison. A type of leak detector for monitoring leakage rates is disclosed in application Ser. No. 630,667.

Utilizing the above methods a determination of whether or not an aircraft hydraulic system is subject to cavitation damage can be made. Any one or a combination of the test methods illustrated above can be utilized. The reduction in cavitation damage utilizing functional fluid compositions of this invention, in addition, can be determined utilizing the above test methods. Thus, it has been found that cavitation damage in an aircraft hydraulic system can be determined and in addition the reduction in cavitation damage utilizing functional fluid compositions of this invention can be determined. It has been found that a tremendous reduction in cavitation damage is observed when functional fluid compositions of this invention are compared to functional fluid compositions not having incorporated therein additive amounts of a perfluoro alkylene ether-containing compound when used in hydraulic systems subject to cavitation damage. Therefore as a result of the excellent control of damage utilizing the compositions of this invention, hydraulic systems and in particular aircraft hydraulic systems can have cavitation damage inhibited and controlled continually from the time of introduction of the functional fluid compositions of this invention into a hydraulic system. Thus, included within this invention is a process for continually controlling cavitation damage in a hydraulic system which is subject to cavitation damage when operated using a hydraulic fluid comprising a major amount of a base stock selected from those described above having incorporated therein a damage inhibiting amount of a perfluoro alkylene ether-containing compound.

As a result of the excellent inhibition and control damage utilizing the functional fluid compositions within the scope of this invention, improved hydraulic pressure devices can be prepared in accordance with this invention which comprise in combination a fluid chamber and an actuating fluid composition in said chamber, said fluid comprising a major amount of one or more of the base stocks hereinbefore described and a damage inhibiting amount of a perfluoro alkylene ether-containing compound. In such a system, the parts which are so lubricated include the frictional surfaces of the source of power, namely the pump, valves, operating pistons and cylinder, fluid motors, and in some cases, for machine tools, the ways, tables and slides. The hydraulic system may be of either the constant-volume or the variable volume type of system.

The pumps may be of various types, including centrifugal pumps, jet pumps, turbine vane, liquid piston gas compressors, piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves, relief valves, servo valves, non-return valves, poppet valves or unloading valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission. It is, therefore, especially important that the frictional parts of the fluid system which are lubricated by the functional fluid be protected from damage. Thus, damage brings about seizure of frictional parts, excessive wear and premature replacement of parts.

The fluid compositions of this invention when utilized as a functional fluid can also contain dyes, pour point depressants, metal deactivator, acid scavengers, antioxidants, defoamers in concentration sufficient to impart antifoam properties, such as from about 10 to about 100 parts per million, viscosity index improvers such as polyalkylacrylates, polyalkylmethacrylates, polycyclic polymers, polyurethanes, polyalkylene oxides and polyesters, lubricity agents and the like.

It is also contemplated within the scope of this invention that the base stock as aforedescribed can be utilized singly or as a fluid composition containing two or more base stocks in varying proportions. The base stocks can also contain other fluids which include in addition to the functional fluids described above fluids derived from coal products, and synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, alkyl benzenes, (e.g., monoalkylbenzene such as dodecyl benzene, tetradecylbenzene, etc.), and dialkylbenzenes (e.g., n-nonyl-2-ethyl hexylbenzene); polyphenyls (e.g., biphenyls and terphenyls), hydrocarbon oils including mineral oils derived from petroleum sources and synthetic hydrocarbon oils, examples of which are mineral oils having a wide range of viscosities and volatilities such as naphthenic base, paraffinic base and mixed base mineral oils; synthetic hydrocarbon oils such as those derived from oligomerization of olefins such as polybutenes and oils derived from high-alpha-olefins of from 8 to 20 carbon atoms by acid catalyzed dimerization and by oligomerization using trialuminum alkyls as catalysts; halogenated benzene, halogenated lower alkylbenzene, monohalogenated diphenyl ethers, dicarboxylic acid esters, polycarboxylic acid esters and complex esters representative of which are di(2-ethylhexyl) azelate, di(2-ethylhexyl) sebacate, diisooctyl sebacate, 2-ethylhexyl 3:5:5 trimethylhexyl sebacate, diisooctyl azelate, di(3:5:5 trimethylhexyl) sebacate, di(1-methyl-4-ethyloctyl) sebacate, diisodecyl azelate, diisotridecyl azelate, di(1-methyl-4-ethyloctyl) glutarate, di(2-ethylhexyl) adipate, di(3-ethylhexyl) azelate, di(3:5:5 trimethylhexyl) azelate, di(2-ethylhexyl) adipate, di($C_{10}$ oxo) adipate, bis(diethylene glycol monobutyl ether) adipate, di(isooctyl/isodecyl) adipate, diisotridecyl adipate, triethylene glycol di(2-ethylhexanoate), hexanediol 1,6-di(2-ethylhexanoate), trimethylolpropane, tri-n-pelargonate, trimethylolpropane triaproate, trimethylolpropane, tricaprylate, the trimethylolpropane triester of mixed octanoates, pentaerythrityl tetrabutyrate, pentaerythrityl tetravalerate, pentaerythrityl tetracaproate, pentaerythrityl dibutyrate dicaproate, pentaerythrityl butyrate caproate divalerate, pentaerythrityl butyrate trivalerate, pentaerythrityl butyrate tricaproate, pentaerythrityl tributyrate caproate. Suitable dipentaerythrityl esters include dipentaerythrityl hexavalerate, dipentaerythrityl hexacaproate, dipentaterythrityl hexaheptoate, dipentaerythrityl hexacaprylate, dipentaerythirtyl tributyrate tricaproate, dipentaerythrityl trivalerate trinonylate, dipentaterythrityl mixed hexaesters of $C_{4-10}$ fatty acids and complex esters which are esters prepared from methylene glycol (1 mole), adipic acid (2 moles) and 2-ethylhexanol (2 moles); esters prepared from tetraethylene glycol (1 mole), sebacic acid (2 moles), and 2-ethylhexanol (2 moles); esters prepared from 2-ethyl-1,3-hexanediol (1 mole), sebacic acid (2 moles) and 2-ethylhexanol (2 moles); esters prepared from diethylene glycol (1 mole), adipic acid (2 moles) and n-butanol (2 moles); esters prepared from polyglycol 200 (1 mole), sebacic acid (2 moles) and ethylene glycol mono(2-ethylbutyl) ether (2 moles); esters prepared from sebacic acid (1 mole), tetraethylene glycol (2 moles) and caproic acid (2 moles); esters prepared from triethylene glycol (1 mole), adipic acid (1 mole), n-caproic acid (1 mole) and 2-ethylhexanol (1 mole); esters prepared from sebacic acid (1 mole), lactic acid (2 moles) and n-butanol (2 moles); esters prepared from tetraethylene glycol (1 mole), lactric acid (2 moles) and butyric acid (2 moles); complex esters preprepared from tetraethylene glycol (1 mole), lactic acid (1 mole) and monocarboxylic acids (2 moles) and complex esters prepared from neopentyl glycol (1 mole) dicarboxylic acids (2 moles) and monohydric neoalcohols, e.g., 2,2,4-trimethylpentanol (2 moles).

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. A composition comprising
(A) at least 60% by weight of a hydrocarbon phosphorus ester having the formula

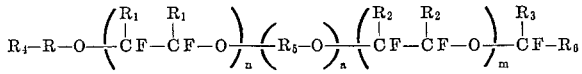

wherein $R_{10}$, $R_{11}$ and $R_{12}$ are each an alkyl, alkoxyalkyl, aralkyl, aroxyaryl, arylaroxyaryl, alkoxyaryl, alkaryl group or one of said groups substituted with halogen, said groups containing up to 18 carbon atoms or mixtures thereof; and
(B) from 0.005 to about 15% by weight of a perfluoroalkylene ether represented by the structure $$R_4-R-O-\left(\begin{array}{cc}R_1 & R_1 \\ | & | \\ CF-CF-O \end{array}\right)_n\left(R_5-O\right)_a\left(\begin{array}{cc}R_2 & R_2 \\ | & | \\ CF-CF-O \end{array}\right)_m\begin{array}{c}R_3 \\ | \\ CF-R_6\end{array}$$

wherein R is perfluoroalkylene, $R_1$ is fluorine or trifluoromethyl, provided not more than one $R_1$ is trifluoromethyl, $R_2$ is fluorine or trifluoromethyl provided that not more than one $R_2$ is trifluoromethyl, $R_3$ is fluorine or trifluoromethyl, $R_4$ is fluorine, $R_5$ is perfluoroalkylene having at least 2 carbon atoms, $R_6$ is hydrogen, trifluoromethyl or perfluoroethyl; $a$ is 0 or 1, $n$ and $m$ are whole numbers having a value of from 0 to 50, and the sum of $n+m$ is from 1 to 50.

2. A composition of claim 1 wherein the perfluoroalkylene ether-containing compound is present in a damage inhibiting amount within the range of from 0.01 to about 10 weight percent.

3. A composition of claim 1 wherein the hydrocarbon phosphorus ester is selected from trialkyl phosphates, triaryl phosphates, mixed aryl-alkyl phosphates and mixtures thereof.

4. A composition of claim 3 wherein the hydrocarbon phosphorus ester is a dialkyl phenyl phosphate.

5. A composition of claim 4 wherein the hydrocarbon phosphorus ester is di-n-butyl phenyl phosphate.

6. A composition of claim 1 wherein the perfluoroalkylene ether has the formula $CF_3CF_2CF_2OCFHCF_3$.

7. A composition of claim 1 wherein the perfluoroalkylene ether has the formula

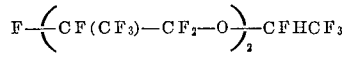

8. A composition of claim 1 wherein the perfluoroalkylene ether has the formula

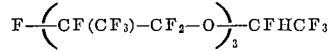

9. A composition of claim 1 wherein the perfluoroalkylene ether has the formula

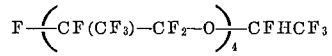

10. A composition of claim 1 wherein the perfluoroalkylene ether has the formula

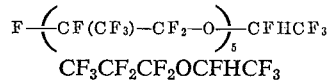
$CF_3CF_2CF_2OCFHCF_3$

11. A process for controlling cavitation damage in a hydraulic system which is subject to cavitation damage when operating using a hydraulic fluid comprising a major amount of a base stock consisting essentially of a hydrocarbon phosphorus ester which comprises incorporating into said hydraulic system a composition consisting essentially of at least 60% by weight of such base stock and from 0.005 to about 15% by weight of a perfluoroalkylene ether-containing compound represented by the structure.

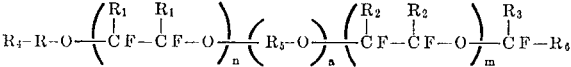

wherein R is perfluoroalkylene, $R_1$ is fluorine or trifluoromethyl, provided not more than one $R_1$ is trifluoromethyl, $R_2$ is fluorine or trifluoromethyl provided that not more than one $R_2$ is trifluoromethyl, $R_3$ is fluorine or trifluoromethyl, $R_4$ is fluorine, $R_5$ is perfluoroalkylene having at least 2 carbon atoms, $R_6$ is hydrogen, trifluoromethyl or perfluoroethyl, $a$ is 0 or 1, $n$ and $m$ are whole numbers having a value of from 0 to 50, and the sum of $n+m$ is from 1 to 50.

12. A process of claim 11 wherein the perfluoroalkylene ether-containing compound is 13. A process of claim 11 wherein the perfluoroalkylene ether-containing compound is

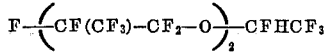
$$F \!-\!\!\left(\!CF(CF_3)\!-\!CF_2\!-\!O\!\right)_{\!2}\!\!-\!CFHCF_3$$

14. A process of claim 11 wherein the perfluoroalkylene ether-containing compound is

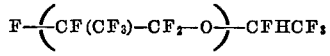
$$F \!-\!\!\left(\!CF(CF_3)\!-\!CF_2\!-\!O\!\right)_{\!3}\!\!-\!CFHCF_3$$

15. A process of claim 11 wherein the perfluoroalkylene ether-containing compound is

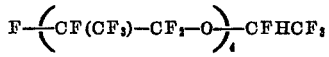
$$F \!-\!\!\left(\!CF(CF_3)\!-\!CF_2\!-\!O\!\right)_{\!4}\!\!-\!CFHCF_3$$

16. A process of claim 11 wherein the perfluorolkylene ether-containing compound is

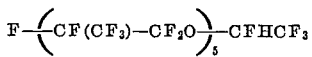
$$F \!-\!\!\left(\!CF(CF_3)\!-\!CF_2O\!\right)_{\!5}\!\!-\!CFHCF_3$$

17. A process of claim 11 wherein the perfluoroalkylene ether-containing compound is present in the range of from 0.01 to about 10 weight percent.

References Cited

UNITED STATES PATENTS

| | | | |
|---|---|---|---|
| 3,513,097 | 5/1970 | Langenfeld | 252—78 |
| 2,934,501 | 4/1960 | Moreton | 252—78 |
| 3,214,478 | 10/1965 | Milian | 252—396X |
| 3,342,875 | 9/1967 | Selman et al. | 260—615 |
| 3,445,392 | 5/1969 | Gumprecht et al. | 252—54 |
| 3,487,020 | 12/1969 | Peeler, et al. | 252—78 |

FOREIGN PATENTS

| | | | |
|---|---|---|---|
| 750,427 | 1/1967 | Canada | 260—614 |

HERBERT B. GUYNN, Primary Examiner

D. SILVERSTEIN, Assistant Examiner

U.S. Cl. X.R.

252—32.5, 389

UNITED STATES PATENT OFFICE
CERTIFICATE OF CORRECTION

Patent No. 3,597,359      Dated August 3, 1971

Inventor(s) Terrill D. Smith

It is certified that error appears in the above-identified patent and that said Letters Patent are hereby corrected as shown below:

Claim 1, line 1, delete "comprising" and substitute -- consisting essentially of -- therefor.

Claim 10, line 4, delete "$CF_3CF_2CF_2OCFHCF_3$".

Claim 12, Line 2, after "is" insert "$CF_3CF_2CF_2OCFHCF_3$".

Claim 14, line 3, after ")" add subscript "3".

Column 7, line 66, "4,4'-(trimethyl disoloxanylene)" should read -- 4,4'-(tetramethyl disoloxanylene) --

Column 14, line 66, "3-bromo-3'-chlorodiphenyl ether" should read -- 3-bromo-4'-chlorodiphenyl ether --.

Signed and sealed this 18th day of April 1972.

(SEAL)
Attest:

EDWARD M. FLETCHER, JR.
Attesting Officer

ROBERT GOTTSCHALK
Commissioner of Patents